(12) United States Patent
Konagai et al.

(10) Patent No.: US 8,480,174 B2
(45) Date of Patent: Jul. 9, 2013

(54) SEAT FRAME REINFORCEMENT STRUCTURE

(75) Inventors: Akira Konagai, Toyota (JP); Makoto Esaki, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 330 days.

(21) Appl. No.: 12/915,383

(22) Filed: Oct. 29, 2010

(65) Prior Publication Data
US 2011/0121627 A1     May 26, 2011

(30) Foreign Application Priority Data
Nov. 20, 2009   (JP) .................................. 2009-264853

(51) Int. Cl.
*B60N 2/42*     (2006.01)
*B60N 2/00*     (2006.01)
*B60R 21/00*    (2006.01)

(52) U.S. Cl.
USPC ................. 297/354.1; 297/216.1; 297/216.13

(58) Field of Classification Search
USPC ................. 297/216.1, 216.13, 354.1, 354.11, 297/354.12, 361.1, 362, 366
See application file for complete search history.

(56) References Cited

U.S. PATENT DOCUMENTS

| | | | | |
|---|---|---|---|---|
| 5,553,922 A | * | 9/1996 | Yamada | 297/362 |
| 5,702,155 A | * | 12/1997 | Ito | 297/362.11 |
| 6,024,410 A | * | 2/2000 | Yoshida | 297/301.1 |
| 6,543,849 B1 | * | 4/2003 | Yamada | 297/363 |
| 6,712,429 B2 | * | 3/2004 | Villarroel | 297/361.1 |
| 6,820,937 B1 | * | 11/2004 | Esaki et al. | 297/366 |
| 7,281,766 B2 | * | 10/2007 | Fujita et al. | 297/378.12 |

FOREIGN PATENT DOCUMENTS
JP    2009-137348    6/2009

* cited by examiner

*Primary Examiner* — David Dunn
*Assistant Examiner* — Philip Gabler
(74) *Attorney, Agent, or Firm* — Greenblum & Bernstein P.L.C.

(57) ABSTRACT

A seat frame reinforcement structure has a reinforcing member that is provided between both side frames that constitute a framework of a seatback of a vehicle seat, is connected to the side frames, and extends in the width direction of the vehicle seat. The reinforcing member includes a rod that is larger in diameter than each of operation pins that pass through center portions of reclining mechanisms, bushings that are connected to respective end portions of the rod, and a guide member that is connected integrally to the side frame so as to surround the outer periphery of a portion of the operation pin, which is exposed due to a clearance formed between an end portion of one of the bushings and the side frame. Due to the provision of the guide member, the diameter of the reinforcing member is maintained large even in a region where there is the clearance.

4 Claims, 3 Drawing Sheets

SEAT FRAME REINFORCEMENT STRUCTURE

INCORPORATION BY REFERENCE

The disclosure of Japanese Patent Application No. 2009-264853 filed on Nov. 20, 2009 including the specification, drawings and abstract is incorporated herein by reference in its entirety.

BACKGROUND OF THE INVENTION

1. Field of the Invention

The invention relates generally to a seat frame reinforcement structure, and, more specifically to a seat frame reinforcement structure including a long reinforcing member that extends in the seat-width direction and that is provided between and connected to both side frames that constitute a framework of a seatback or a seat cushion.

2. Description of the Related Art

There is an existing seatback frame structure in which a reinforcing member is provided between and connected to both side frames to increase the side impact resistance of a seat. Japanese Patent Application Publication No. 2009-137348 (JP-A-2009-137348) describes a reinforcement structure in which a round pipe that serves as a reinforcing member is provided between and connected to both side frames of a seatback and a rod extends through the reinforcing member. The rod connects operation shafts of right and left reclining mechanisms to each other. According to JP-A-2009-137348, a framework structure of the seatback is reinforced by the round pipe used as the reinforcing member, and the rod is protected so as not to be exposed.

However, the double structure described in JP-A-2009-137348, in which the rod passes through the reinforcing member, increases the weight of a portion where reinforcing member and the rod are both provided.

SUMMARY OF THE INVENTION

The invention provides a seat frame reinforcement structure with which the weight of a reinforcing member is reduced without hindering the function of reinforcing a seat frame.

An aspect of the invention relates to a seat frame reinforcement structure that includes a reinforcing member that is provided between both side frames that constitute a framework of a vehicle seat, that is connected to the side frames, and that extends in a width direction of the vehicle seat. The reinforcing member includes a guide member, and a tubular rod which is provided between the side frames, which extends in the width direction of the vehicle seat, and of which end portions are supported so as to be rotatable with respect to the side frames. An operation pin of a reclining mechanism, which passes through the side frame, is inserted in an end portion of the rod in an axial direction of the reinforcing member so that the rod is connected to the operation pin so as to be rotatable together with the operation pin in the same rotational direction. The diameter of the rod is larger than a diameter of the operation pin. A clearance is left between the end portion of the rod, to which the operation pin is connected, and the side frame that faces the end portion in the axial direction. The guide member is connected integrally to the side frame, extends from the side frame in the axial direction, and surrounds an outer periphery of a portion of the operation pin, which is exposed due to the clearance.

According to the aspect described above, the reinforcing member provided between the side frames is formed of the guide member and the rod. The reinforcing member is larger in diameter than the operation pin. Even in a region where the operation pin is exposed due to the clearance between the end portion of the rod and the side frame, the diameter of the reinforcing member is maintained large. Therefore, the diameter of a portion of the reinforcing member between the side frame and the rod is maintained large. With this structure, the function as the reinforcing member is fulfilled. The rod is connected to the operation pin so as to be rotatable together with the operation pin in the same rotational direction. When the operation pins pass through the side frames, if the operation pins are connected to each other, it is possible to transmit a rotational operation force for rotating one of the operation pins to the other operation pin to rotate these operation pins in synchronization. Because the rod that is connected to the operation pins to fulfill the function as a rotational force transmitting member has a large diameter, the rod serves also as the reinforcing member. Therefore, the structure of the reinforcing member is simplified as compared to the case where a reinforcing member is provided in addition to a rotating force transmitting member. As a result, it is possible to reduce the weight of the reinforcing member without hindering the function of reinforcing a seat frame.

In the aspect described above, the guide member may be formed in a cylindrical shape. Each of the guide member and the rod may have a flange that extends radially outward, the flanges facing each other in the axial direction. The flanges may be kept apart from each other in the axial direction in normal times. If a pressing force is applied in such a direction that the distance between the side frames is decreased, the flanges may be brought into surface contact with each other in the axial direction.

With the structure described above, if a high pressing force is applied due to, for example, a side impact to a vehicle in such a direction that the distance between the side frames is decreased, the flanges of the guide member and the rod may be brought into surface contact with each other in the axial direction to bear the pressing force. With this structure, it is possible to further increase the side impact resistance of the seat frame.

In the aspect described above, the reinforcing member may further include a bushing that is fitted to the end portion of the rod. The bushing may have a fit portion that is fitted in the end portion of the rod in the axial direction so that the bushing and the rod are rotatable together with each other in the same rotational direction, and an accommodating portion in which an end portion of the operation pin is fitted in the axial direction so that the bushing and the operation pin are rotatable together with each other in the same rotational direction.

With the structure described above, it is possible to easily form an engagement portion at which the large-diameter tubular rod and the small-diameter operation pin are engaged with each other, because the engagement portion is formed of the bushing that is fitted to the rod.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EXAMPLE EMBODIMENTS

Hereafter, an embodiment of the invention will be described with reference to the accompanying drawings.

Figure 1:
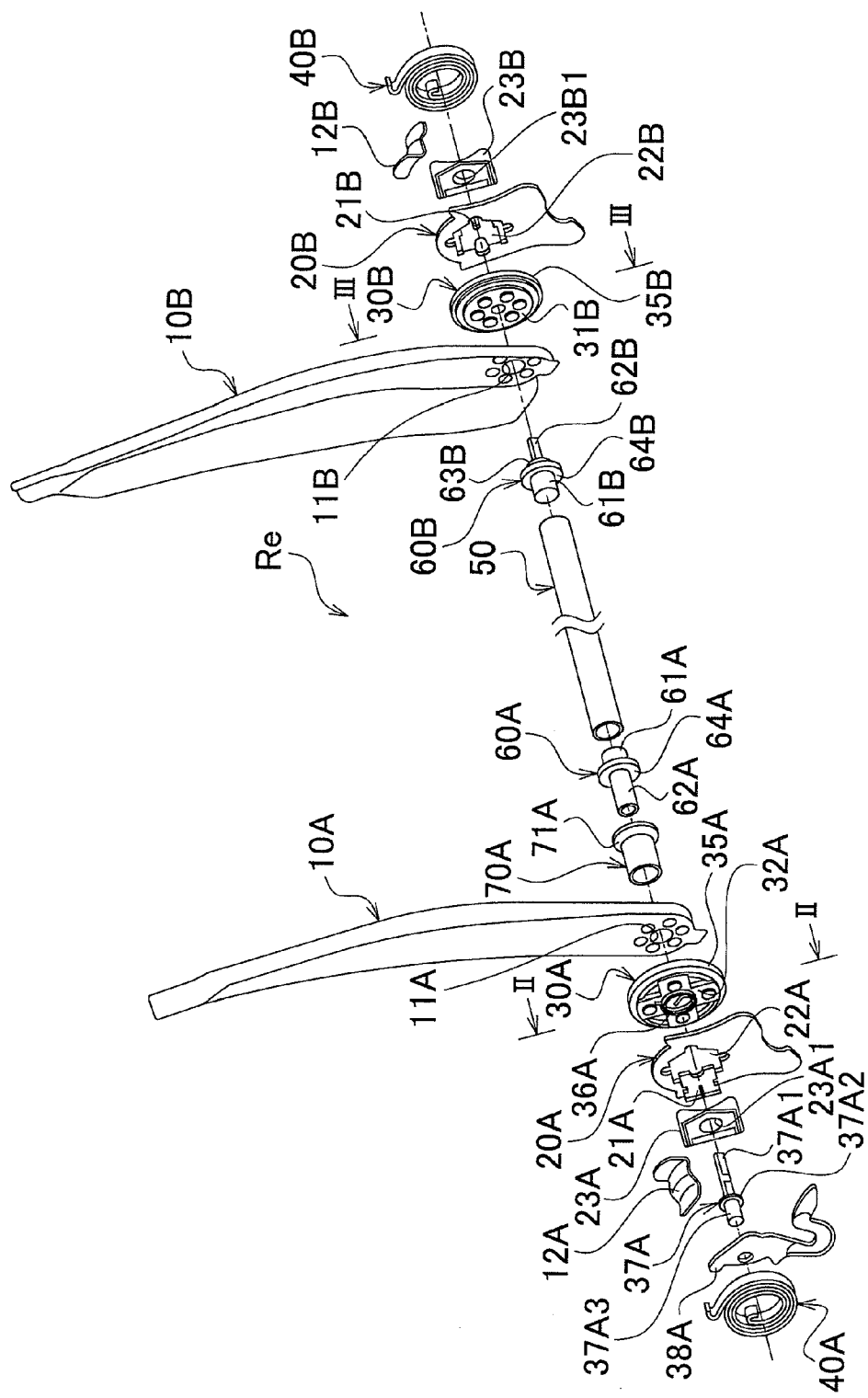
FIG. 1 is an exploded perspective view of a seat frame reinforcement structure according to an embodiment of the invention.

First, a seat frame reinforcement structure according to an embodiment of the invention will be described with reference to FIGS. 1 to 3. As shown in FIG. 1, with the seat frame reinforcement structure according to the embodiment, the strength of a framework of an automobile seat (vehicle seat) is increased so that the side impact resistance of the seat is increased, that is, an occupant is protected more reliably in the event of a side impact to the automobile. More specifically, in the seat frame reinforcement structure, a laterally-long reinforcing member Re is provided between and connected to both side frames 10A and 10B that constitute frames of left and right portions of a seatback, respectively. The reinforcing member Re is formed by fitting a rod 50, bushings 60A and 60B and a guide member 70A together. A side impact load Fs (see FIG. 2) that is applied to the side frame 10A is transmitted to the side frame 10B by the reinforcing member Re. With this seat frame reinforcement structure, the side impact resistance of the seat is increased.

The concrete structure of the above-mentioned seat frame reinforcement structure will be described below in detail. FIG. 1 shows a pair of the left and right side frames 10A and 10B that constitute the frameworks of the left and right portions of the seatback, respectively, and a pair of left and right side frames 20A and 20B that constitute frameworks of left and right portions of a seat cushion, respectively. The side frames 10A and 10B of the seatback are formed of long steel plate members and extend in the up-down direction. A front edge portion and a rear edge portion of each of the side frames 10A and 10B are bent inward in the seat-width direction so as to face each other.

Upper end portions of the side frames 10A and 10B are rigidly-connected and secured to end portions of an upper frame (not shown) that is formed into an inverted U-shape. Thus, the upper end portions of the side frames 10A and 10B are rigidly-connected to each other via the above-described upper frame (not shown). Through-holes 11A and 11B through which operation pins 37A and 62B, described later in detail, pass in the axial direction are formed in lower end portions of the side frames 10A and 10B, respectively.

The side frames 20A and 20B of the seat cushion are formed of steel plate members, and constitute pat of the frameworks of the left and right portions of the seat cushion, respectively. The side frames 20A and 20B are rigidly-connected to a frame that constitutes a framework of the seat cushion (not shown). The side frames 20A and 20B are rigidly-connected to each other via the frame.

The side frames 10A and 10B of the seatback and the side frames 20A and 20B of the seat cushion are connected to each other via reclining mechanisms 30A and 30B in such a manner that the side frames 10A and 10B and the side frames 20A and 20B are allowed to pivot with respect to each other and to stop pivoting, respectively. The reclining mechanisms 30A and 30B are provided between the side frames 10A and 10B, and the side frames 20A and 20B, respectively. Note that an existing structure described in Japanese Patent Application Publication No. 2009-207601 (JP-A-2009-207601) is employed as the basic structure of the reclining mechanisms 30A and 30B. Therefore, the basic structure of the reclining mechanism 30A that is shown in the left side of FIG. 1 will be described briefly. Within the description on the reclining mechanism 30A, the structure of the reclining mechanism 30B that is shown in the right side of FIG. 1 will be also described (the reference numerals of the elements of the reclining mechanism 30B will be provided in parentheses).

Figure 2:
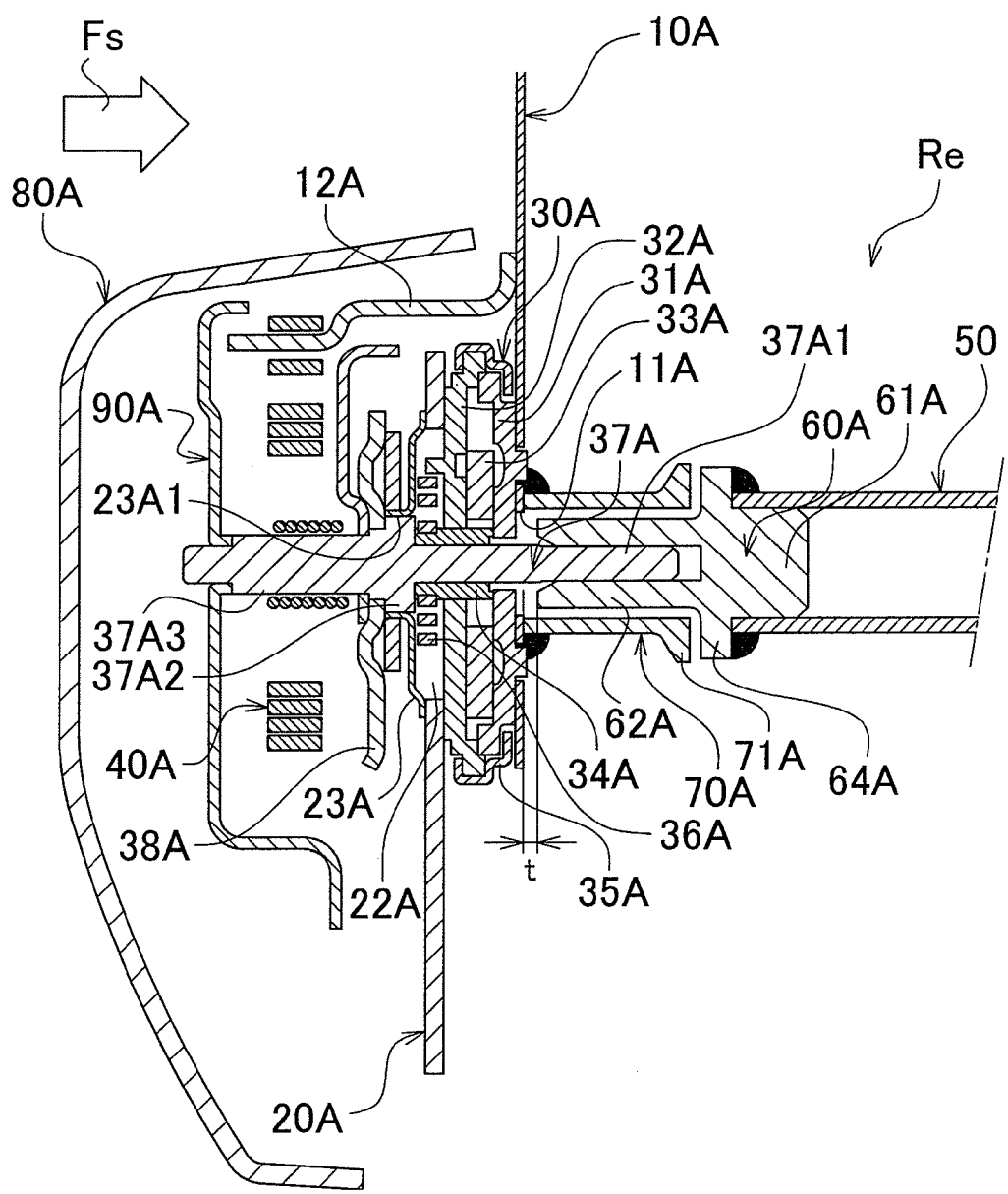
FIG. 2 is a cross-sectional view of the seat frame reinforcement structure taken along the line II-II in FIG. 1.

As shown in FIG. 1 and FIG. 2 (FIG. 3), the reclining mechanism 30A (30B) includes: a disk-shaped ratchet 31A (31B); a disk-shaped guide 32A (32B); a lock member 33A (33B) that is disposed between the ratchet 31A (31B) and the guide 32A (32B); a hinge pin 34A (34B) that is used to actuate the rock member 33A (33B); an outer peripheral ring 35A (35B) that keeps the ratchet 31A (31B) and the guide 32A (32B) fitted together; and a spiral spring 36A (36B) that urges the hinge pin 34A (34B) in such a rotational direction that the hinge pin 34A (34B) actuates the lock member 33A (33B).

The ratchet 31A (31B) and the guide 32A (32B) are coaxially fitted together in such a manner that disk faces of the ratchet 31A (31B) and the guide 32A (32B) overlap with each other. Thus, the ratchet 31A (31B) and the guide 32A (32B) support each other in such a manner that the ratchet 31A (31B) and the guide 32A (32B) are rotatable relative to each other about the same axis. The ratchet 31A (31B) and the guide 32A (32B) are held by the outer peripheral ring 35A (35B) so that the ratchet 31A (31B) and the guide 32A (32B) are not disconnected from each other in the axial direction. The ratchet 31A (31B) is brought into contact with an outer face of the side frame 10A (10B) of the seatback, and is welded integrally to the side frame 10A (10B).

The guide 32A (32B) is brought into contact with an inner face of the side frame 20A (20B) of the seat cushion, and is welded integrally to the side frame 20A (20B). The lock member 33A (33B) is provided between the ratchet 31A (31B) and the guide 32A (32B). The lock member 33A (33B) prohibits the relative rotation between the ratchet 31A (31B) and the guide 32A (32B) when the lock member 33A (33B) is engaged with the ratchet 31A (31B). The lock member 33A (33B) allows the relative rotation between the ratchet 31A (31B) and the guide 32A (32B) when the lock member 33A (33B) is disengaged from the ratchet 31A (31B). The lock member 33A (33B) is supported by the guide 32A (32B). The lock member 33A (33B) is moved in such a direction that the lock member 33A (33B) is engaged with the ratchet 31A (31B) so as to be actuated or in such a direction that the lock member 33A (33B) is disengaged from the ratchet 31A (31B), in accordance with the rotation of the cylindrical hinge pin 34A (34B) that passes through a center portion of the reclining mechanism 30A (30B).

The hinge pin 34A (34B) passes through a center portion of the guide 32A (32B) (the center portion of the reclining mechanism 30A (30B)), and extends in the axial direction. The hinge pin 34A (34B) is supported by the guide 32A (32B) so as to be rotatable about its axis. In normal times, the hinge pine 34A (34B) is urged in such a rotational direction that the hinge pin 34A (34B) is moved to actuate the lock member 33A (33B), by an urging force of the spiral spring 36A (36B) provided between and hooked to the hinge pin 34A (34B) and the guide 32A (32B). Thus, in the reclining mechanism 30A (30B), the lock member 33A (33B) is engaged with the ratchet 31A (31B) by the urging force of the spiral spring 36A (36B) in normal times. As a result, in normal times, the relative rotation between the ratchet 31A (31B) and the guide 32A (32B) is prohibited.

Thus, the seatback is held in the state where the reclining angle of the seatback with respect to the seat cushion is fixed by the reclining mechanism 30A (30B) in which the relative rotation between the ratchet 31A (31B) and the guide 32A (32B) is prohibited. When the operation pin 37A (62B) that passes through a center portion of the hinge pin 34A (34B) is rotated in response to an operation of an operation lever 38A, the hinge pin 34A (34B) is rotated in a direction opposite to the direction, in which the hinge pin 34A (34B) is rotated by the above-described urging force.

Due to this rotation, the hinge pin 34A (34B) moves the lock member 33A (33B) in such a direction that the lock member 33A (33B) is disengaged from the ratchet 31A (31B), and the relative rotation between the ratchet 31A (31B) and the guide 32A (32B) is allowed. Thus, the seatback is allowed to pivot about the central axis of the reclining mechanism 30A (30B) in which the relative rotation between the ratchet 31A (31B) and the guide 32A (32B) is allowed, that is, the seatback is allowed to pivot about the central axis about which the ratchet 31A (31B) and the guide 32A (32B) rotate relative to each other. As a result, the reclining angle of the seatback with respect to the seat cushion may be changed. The axis of rotation of the reclining mechanism 30A is coaxial with the axis of rotation of the reclining mechanism 30B.

Spiral springs 40A and 40B are provided between and hooked to the side frames 10A and 10B of the seatback and the side frames 20A and 20B of the seat cushion, respectively. The spiral springs 40A and 40B always urge the seatback in such a direction that the seatback pivots toward the seat cushion. Inner end portions of the spiral springs 40A and 40B are hooked over and secured to spring hook portions 21A and 21B, and outer end portions of the spiral springs 40A and 40B are hooked over and secured to L-shaped engagement pieces 12A and 12B, respectively. The spring hook portions 21A and 21B are formed by cutting part of the side frames 20A and 20B of the seat cushion and bending the cut portions so that the cut portions rise from the side frames 20A and 20B, respectively. The engagement pieces 12A and 12B are fixed to the side frames 10A and 10B of the seatback, respectively.

Lids 23A and 23B are fitted to the side frames 20A and 20B of the seat cushion, respectively. The lids 23A and 23B are used to block openings 22A and 22B that are formed by cutting part of the side frames 20A and 20B to form the spring hook portions 21A and 21B, respectively. Through-holes 23A1 and 23B1 are formed in the lids 23A and 23B, respectively. The operation pins 37A and 62B pass through the through-holes 23A1 and 23B1, respectively, in the axial direction. Next, the structure of the reinforcing member Re that is provided between and connected to the side frames 10A and 10B of the seatback will be described with reference to FIG. 1. The reinforcing member Re is formed by fitting the rod 50, the bushings 60A and 60B and the guide member 70A together.

The rod 50 is formed of a long and round steel pipe, and extends in the seat-width direction (the direction in which the side frames 10A and 10B are aligned: the direction in which the axis of rotation of the reclining mechanisms 30A and 30B extends). The bushings 60A and 60B formed of steel members are fitted in the respective end portions of the rod 50. The bushing 60A shown in the left side of FIG. 1 is formed in a stepped cylindrical shape. A cylindrical fit portion 61A that is fitted in the rod 50 is formed at one axial end of the bushing 60A.

A cylindrical accommodating portion 62A that is smaller in diameter than the fit portion 61A is formed at the other axial end of the bushing 60A. The operation pin 37A is fitted in the accommodating portion 62A in the axial direction in such a manner that the bushing 60A is rotatable together with the operation pin 37A in the same rotational direction. The inner periphery of the accommodating portion 62A is formed in a quadrangular shape in cross section. A pin portion 37A1 of the operation pin 37A, which is fitted in the accommodating portion 62A, is formed in a quadrangular rod that conforms to the shape of accommodating portion 62A. The pin portion 37A1 and the accommodating portion 62A are connected to each other in the axial direction so as to be rotatable together with each other in the same rotational direction.

A flange 64A that extends radially outward is formed on the outer periphery of the bushing 60A, at a position between the fit portion 61A and the accommodating portion 62A. As shown in FIG. 2, the fit portion 61A of the bushing 60A is inserted in the rod 50 until the flange 64A contacts an end face of the rod 50. In this state, the outer periphery of a portion of the rod 50, which contacts the flange 64A, is welded to the flange 64A. Thus, the bushing 60A is firmly and integrally connected to the rod 50.

The pin portion 37A1 of the operation pin 37A, which is fitted in the accommodating portion 62A of the bushing 60A, passes also through the hinge pin 34A that is provided at the center portion of the reclining mechanism 30A. Thus, the operation pin 37A is fitted also to the hinge pin 34A so as to be rotatable together with the hinge pin 34A in the same rotational direction. Thus, the operation pin 37A, the hinge pin 34A of the reclining mechanism 30A, the bushing 60A and the rod 50 are connected to each other so as to be rotatable together with each other in the same direction.

A large-diameter portion 37A3 that is larger in diameter than the pin portion 37A1 is formed in an end portion of the operation pin 37A, which is on the opposite side of the pin portion 37A1. The large-diameter portion 37A3 has a round rod shape. The operation lever 38A is fitted on and secured to the outer periphery of the large-diameter portion 37A3. The large-diameter portion 37A3 gas a large diameter so that a rotational operation force, which is generated when the operation lever 38A is puller up against the urging force of the spiral spring 36A of the reclining mechanism 30A, is appropriately transmitted to the hinge pin 34A. A mechanism (another-purpose member 90A) used to rotate the operation pin 37A for another purpose is connected to the large-diameter portion 37A3. Therefore, the diameter of the large-diameter portion 37A3 is larger than the diameter of the pin portion 37A1, which is set to such a small value that the pin portion 37A1 can be fitted in the hinge pin 34A.

The diameter of the pin portion 37A1 of the operation pin 37A, which is fitted into the bushing 60A, is smaller than the diameter of the large-diameter portion 37A3. The operation pin 37A is formed in this shape because the operation pin 37A is connected to the operation lever 38A on the outer side of the reclining mechanism 30A. A flange 37A2 that extends radially outward is formed on the outer periphery of the operation pin 37A at a position between the large-diameter portion 37A3 and the pin portion 37A1. The pin portion 37A1 is inserted into the hinge pin 34A until the flange 37A2 contacts the hinge pin 34A.

Thus, the operation pin 37A is supported so as to be rotatable with respect to the side frame 10A of the seatback and the side frame 20A of the seat cushion via the hinge pin 34A. When the operation lever 38A is pulled up, a rotational operation force is generated. The operation pin 37A transmits the rotational operation force to the hinge pin 34A to allow the relative rotation between the ratchet 31A and the guide 32A of the reclining mechanism 30A. In accordance with the rotation of the operation pin 37A, the bush 60A and the rod 50 rotate together with the operation pin 37A.

A resin shield 80A is provided at a connection portion at which the side frame 10A of the seatback and the side frame 20A of the seat cushion are connected to each other. The shield 80A is provided to shield the connection portion. The bushing 60B shown in the right side of FIG. 1 is formed in a stepped cylindrical shape. A cylindrical fit portion 61B which is fitted in the rod 50 is formed at one axial end of the bushing 60B.

The operation pin 62B is formed at the other axial end of the bushing 60B. The operation pin 62B is formed in a quadrangular rod shape, and passes through the hinge pin 34B of the reclining mechanism 30B to fulfill its function. The operation pin 62B projects straight in the axial direction from a center portion of a column-shaped large-diameter portion 63B formed in the bushing 60B. A flange 64B that extends radially outward is formed on the outer periphery of the bushing 60B at a position between the fit portion 61B and the large-diameter portion 63B.

Figure 3:
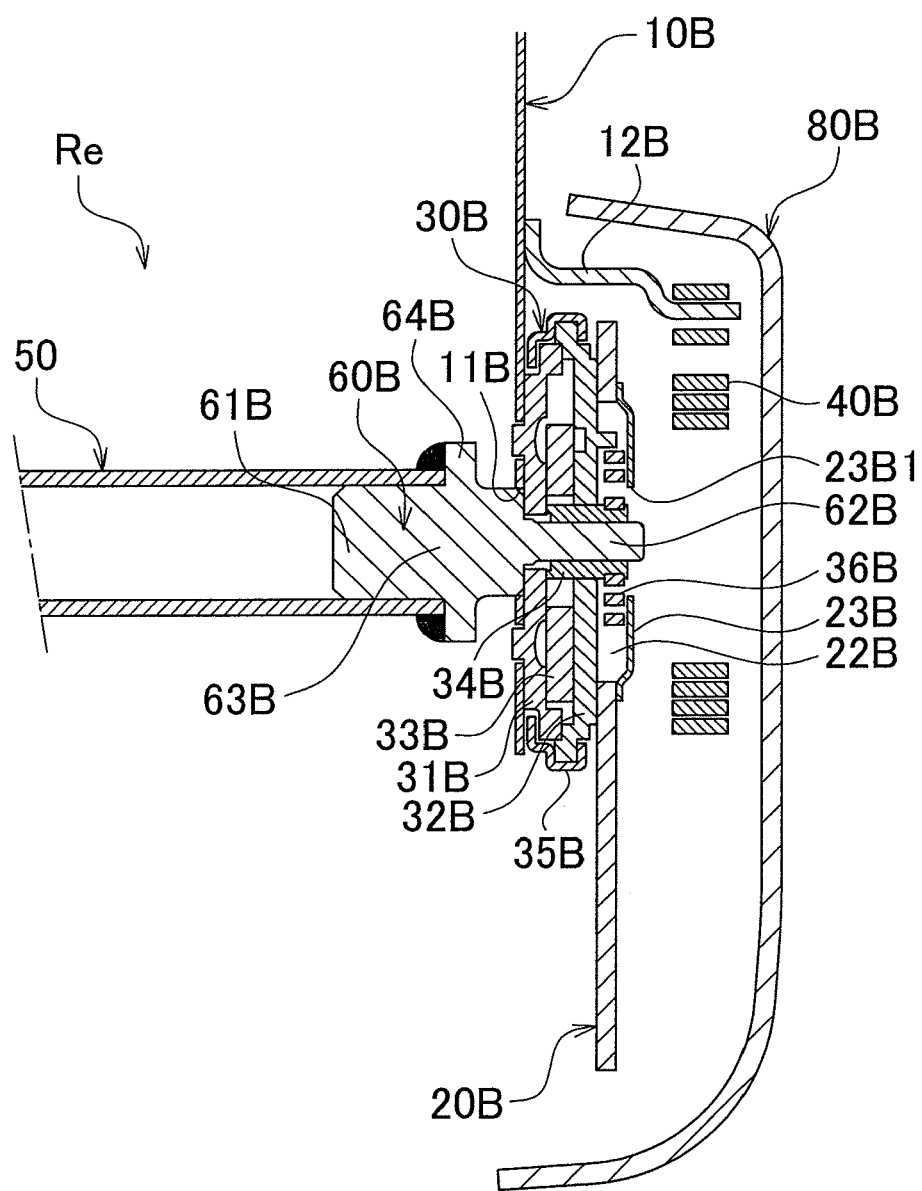
FIG. 3 is a cross-sectional view of the seat frame reinforcement structure taken along the line III-III in FIG. 1.

As shown in FIG. 3, the fit portion 61B of the bushing 60B is inserted in the rod 50 until the flange 64B contacts an end face of the rod 50. In this state, the outer periphery of a portion of the rod 50, which contacts the flange 64B, is welded to the flange 64B. Thus, the bushing 60B is firmly and integrally connected to the rod 50. The large-diameter portion 63B of the bushing 60B is inserted in the through-hole 11B formed in the side frame 10B of the seatback, and the operation pin 62B is inserted in the hinge pin 34B provided at a center portion of the reclining mechanism 30B until the large-diameter portion 63B contacts an outer face of the ratchet 31B. As a result, the operation pin 62B is connected to the hinge pin 34B so as to be rotatable together with the hinge pin 34B in the same rotational direction.

Thus, the hinge pine 34B of the reclining mechanism 30B, the bushing 60B (operation pin 62B) and the rod 50 are fitted together so as to be rotatable together with each other in the same rotational direction. The operation pin 62B of the bushing 60B is supported so as to be rotatable with respect to the side frame 10B of the seatback and the side frame 20B of the seat cushion via the hinge pin 34B.

When the operation lever 38A connected to the above-described large-diameter portion 37A3 shown in FIG. 2 is pulled up, a rotational operation force is generated. The operation pin 62B receives the rotational operation force and rotates, and transmits the rotational operation force to the hinge pin 34B to allow the relative rotation between the ratchet 31B and the guide 32B of the reclining mechanism 30B. That is, the reinforcing member Re formed by connecting the bushings 60A and 60B and the rod 50 together serves as a rotational force transmitting member. The rotational force transmitting member transmits an operation force generated by rotating the operation pin 37A fitted to the reclining mechanisms 30A to the operation pin 62B fitted to the reclining mechanism 30B. As a result, a rotational operation for allowing the relative rotation between the ratchet 31A and the guide 32A of the left reclining mechanism 30A and a rotational operation for allowing the relative rotation between the ratchet 31B and the guide 32B of the right reclining mechanism 30B are performed in synchronization.

A resin shield 80B is fitted to a connection portion at which the side frame 10B of the seatback and the side frame 20B of the seat cushion are connected to each other. The shield 80B is used to shield the connection portion. As shown in FIG. 2, the cylindrical guide member 70A formed of a steel member is provided at an engagement portion, at which the small-diameter pin portion 37A1 of the operation pin 37A is fitted in the accommodating portion 62A of the bushing 60A, so as to surround the entire outer periphery of the engagement portion.

One end of a cylindrical portion of the guide member 70A is brought into contact with an inner face of the side frame 10A of the seatback, and the guide member 70A is connected integrally to the side frame 10A. The guide member 70A is formed in such a manner that the outer diameter of the cylindrical portion of the guide member 70A is substantially equal to the outer diameter of the rod 50. When the accommodating portion 62A of the bushing 60A is inserted in the cylindrical guide member 70A, a flange 71A of the guide member 70A faces the flange 64A of the bushing 60A in the axial direction. The flange 71A is formed at the other end of the guide member 70A, and extends radially outward. The flange 64A also extends radially outward.

The flange 71A has a large-width portion which rises from the outer periphery of the guide member 70A and of which the outer diameter gradually increases. Due to the large-width portion, the width of the flange 71A is large in the axial direction. As shown in FIG. 2, the flange 71A and the flange 64A are slightly apart from each other in the axial direction in normal times. Due to the provision of the guide member 70A, the long and large-diameter reinforcing member Re that extends in the seat-width direction from the side frame 10A to the side frame 10B is formed by the guide member 70A, the bushing 60A, the rod 50 and the bushing 60B (large-diameter portion 63B) shown in FIG. 3.

More specifically, each of the diameters of the rod 50 and the bushing 60A shown in FIG. 2 is larger than that of the operation pin 37A shown in FIG. 2 so that the strength of the rod 50 and the bushing 60A is maintained high. A clearance t for absorbing variations in the axial length of each of the rod 50 and the bushings 60A and 60B is left between an end portion of the bushing 60A and the side frame 10A. Due to the presence of the clearance t, in a region of the reinforcing member Re, where there is the clearance t, the operation pin 37A of which the diameter is smaller than that of each of the rod 50 and the bushings 60A and 60B is exposed.

In the region of the reinforcing member Re, where there is the clearance t, the guide member 70A that is welded integrally to the side frame 10A of the seatback surrounds the outer periphery of a portion of the operation pin 37A, which is exposed due to the clearance t. Thus, even in the region where there is the clearance t, the diameter of the reinforcing member Re is maintained large. Thus, the long and large-diameter reinforcing member Re that extends in the seat-width direction from the side frame 10A to the side frame 10B is formed.

The seatback framework structure is reinforced by the reinforcing member Re. If the side impact load Fs generated by a side impact to the automobile is applied to the side frame 10A from the automobile door-side (outside), that is, the left side in FIG. 2, the side impact load Fs is transmitted from the side frame 10A to the side frame 10B (see FIG. 3) via the rod 50. With this structure, the side impact resistance of the seat is increased.

More specifically, if the side impact load Fs is applied to the side frame 10A from the automobile door-side (outside), a high pressing force is applied in such a direction that the distance between the side frames 10A and 10B is reduced in the axial direction by the action of the side impact load Fs. As a result, the flange 71A of the guide member 70 and the flange 64A of the bushing 60A are pushed against each other in the axial direction. Thus, the side impact load Fs that is directed in the axial direction and applied to the side frame 10A is transmitted from the guide member 70A to the rod 50, and then transmitted to the side frame 10B via the bushing 60B (see FIG. 3). As a result, the side impact load Fs is borne also by the side frame 10B.

With the seat frame reinforcement structure according to the embodiment, the reinforcing member Re that is provided between and connected to the side frames 10A and 10B is formed of the guide member 70A, the rod 50, and bushings 60A and 60B. The diameter of the reinforcing member Re is larger than that of the operation pin 37A. Even in the region where there is the clearance t between the end portion of the bushing 60A that is welded integrally to the rod 50 and the side frame 10A and therefore the operation pin 37A is exposed, the diameter of the reinforcing member Re is maintained large. The diameter of a portion of the reinforcing member Re, which is between the side frame 10A and the rod 50, is maintained large. Thus, the function as the reinforcing member Re is fulfilled.

The rod 50 is connected to the operation pins 37A and 62B so as to be rotatable together with the operation pins 37A and 62B in the same rotational direction. In the structure according to the embodiment in which the operation pins 37A and 62B pass through the side frames 10A and 10B, respectively, if the operation pins 37A and 62B are connected to each other, a rotational operation force for rotating the operation pin 37A is transmitted to the operation pin 62B so that the function of rotating the operation pin 37A and the operation pin 62B in synchronization is fulfilled. The rod 50 that functions as the rotational force transmitting member that connects the operation pins 37A and 62B to each other is formed as a large-diameter member so as to function as the reinforcing member Re. Therefore, the structure of the reinforcing member is simplified as compared to the case where a reinforcing member is provided in addition to a rotating force transmitting member. As a result, it is possible to reduce the weight of the reinforcing member without hindering the function of reinforcing the seat frame.

If a high pressing force is applied, due to, for example, a side impact to the automobile, in such a direction that the distance between the side frames 10A and 10B is reduced, the flange 71A of the guide member 70A and the flange 64A of the bushing 60A (welded integrally to the rod 50) are brought into surface contact with each other in the axial direction, and the pressing force is borne by the surfaces of the flanges 71A and 64A. Therefore, it is possible to further increase the side impact resistance of the seat frame.

The engagement portion at which the operation pin 37A is fitted in the rod 50 is formed of the bushing 60A that is attached to the rod 50. Thus, it is possible to easily form the engagement portion at which the small-diameter operation pin 37A is fitted in the large-diameter tubular rod 50.

The embodiment of the invention has been described. However, the invention may be implemented in various other embodiments. For example, in the embodiment described above, the reinforcing member Re reinforces the seatback framework structure. Alternatively, the reinforcing member may reinforce the seat cushion framework structure. In the embodiment described above, the reinforcing member according to the invention is applied to an automobile seat. Alternatively, the reinforcing member may be applied to vehicles other than automobiles, aircrafts, and vessels.

In the embodiment described above, the reinforcing member Re functions as the rotational force transmitting member that connects the operation pins 37A and 62B, which pass through the side frames 10A and 10B of the seatback, respectively, to each other, and that rotates the operation pins 37A and 62B in synchronization. Alternatively, the reinforcing member may be connected to at least one of the operation pins, and rotate together with this operation pin to fulfill some sort of function.

In the embodiment described above, the reclining mechanisms 30A and 30B in which the lock members 33A and 33B are engaged with the ratchets 31A and 31B or disengaged from the ratchets 31A and 31B by the rotation of the operation pins 37A and 62B, respectively, are used. Alternatively, the seat frame reinforcement structure according to the invention in which the rod is used as the rotational force transmitting member may be applied to a so-called continuous reclining mechanism as described in JP-A-2008-18055. In the continuous reclining mechanism, an external gear member having an external gear rotates on an internal gear tooth face of an internal gear member having an internal gear while changing the meshing position in accordance with the rotation of an operation pin, and the rotation of the gears is prohibited by an operation force that is applied in such a direction that the gears are meshed with each other.

In the embodiment described above, the clearance t is left between the rod 50 and the side frame 10A, and the guide member 70A that surrounds a portion of the operation pin 37A, which is exposed due to the clearance t, is welded integrally to the side frame 10A. Alternatively; the structure in which a clearance is covered with the guide member may be provided between the rod and the side frame 10B. In the embodiment described above, the flange 71A of the guide member 70A and the flange 64A of the bushing 60A (welded integrally to the rod 50) that are brought into surface contact with each other in the axial direction are formed along the entire circumferences of the guide member 70A and the bushing 60A, respectively. However, these flanges need not be formed along the entire circumferences of the guide member 70A and the bushing 60A. A flange may be formed at least a portion of each of the guide member 70A and the bushing 70A in the circumferential direction, as long as it is possible to bring the flanges into surface contact with each other.

What is claimed is:

1. A seat frame reinforcement structure, comprising:
    a reinforcing member that is provided between side frames of a framework of a vehicle seat, the reinforcing member connected to the side frames and extending in a width direction of the vehicle seat, wherein:
    the reinforcing member comprises a guide member, a tubular rod and a bushing that is fitted to an end portion of the tubular rod, wherein the tubular rod is provided extending between the side frames in the width direction of the vehicle seat, and wherein end portions of the tubular rod are supported so as to be rotatable with respect to the side frames;
    an operation pin of a reclining mechanism, which passes through one of the side frames, is inserted in an end portion of the bushing in an axial direction of the reinforcing member so that bushing and the tubular rod are connected to the operation pin so as to be rotatable together with the operation pin in the same rotational direction;
    a diameter of the tubular rod is larger than a diameter of the operation pin;
    a clearance is left between an end portion of the bushing, to which the operation pin is connected, and the one of the side frames that faces the end portion of the bushing to which the operation pin is connected;
    the bushing having an accommodating portion defined by an axially extending slot in which an end portion of the operation pin is fitted, and wherein, as a result of the clearance, an end face of the end portion of the operation pin is spaced from a bottom of the slot so as not to contact the bushing; and
    the guide member is connected integrally to the one of the side frames that faces the end portion of the bushing to which the operation pin is connected and extends in the axial direction so as to surround an outer periphery of a portion of the operation pin, which is exposed due to the clearance, wherein a free end of the guide member is configured to confront an end face provided on the bushing.

2. The seat frame reinforcement structure according to claim 1, wherein:

the guide member is formed in a cylindrical shape;

wherein the free end of the guide member has a flange and the end face of the bushing has a flange, both the flange of the guide member and the flange of the bushing extending radially outward, the flanges facing each other in the axial direction;

the flanges are kept apart from each other in the axial direction in normal times; and when a pressing force is applied in such a direction that a distance between the side frames is decreased, the flanges are brought into surface contact with each other in the axial direction.

3. The seat frame reinforcing structure according to claim 2, wherein the flanges are formed along entire circumferences of the guide member and the bushing.

4. The seat frame reinforcing structure according to claim 1, wherein:

the bushing has a fit portion that is fitted in the end portion of the tubular rod in the axial direction so that the bushing and the rod are rotatable together with each other in the same rotational direction.

\* \* \* \* \*